United States Patent [19]

Marx, II et al.

[11] Patent Number: 4,597,272
[45] Date of Patent: Jul. 1, 1986

[54] GREENHOUSE LAVA ROCK COOLING PAD

[76] Inventors: Richard J. Marx, II; Virginia E. Marx, both of Rte. 1, Box 475, Azle, Tex. 76020

[21] Appl. No.: 563,200

[22] Filed: Dec. 19, 1983

[51] Int. Cl.$^4$ .............................................. F28D 5/00
[52] U.S. Cl. ........................................ 62/304; 62/310; 47/17; 261/DIG. 72
[58] Field of Search .......................... 62/304, 310, 311; 261/DIG. 72, 94, 118; 47/17; 165/60

[56] References Cited

U.S. PATENT DOCUMENTS

| 795,443 | 7/1905 | Johnson. | |
| 1,795,161 | 3/1931 | Brabbee | 261/DIG. 72 |
| 3,119,673 | 1/1964 | Asker et al. | 62/94 |
| 3,446,272 | 5/1969 | Gaines, Jr. | 165/21 |
| 3,807,088 | 4/1974 | Jones | 47/1.2 |
| 3,869,826 | 3/1975 | Fischer | 47/17 |
| 4,047,328 | 9/1977 | Kehl et al. | 47/59 |

*Primary Examiner*—Henry Bennett
*Attorney, Agent, or Firm*—James E Bradley

[57] ABSTRACT

An evaporative cooling system for cooling a greenhouse uses lava rocks as the medium. The cooling system includes a grid mounted to an aperture in a wall. Lava rocks are contained in the grid. Water is dispensed on the rocks for causing evaporation. A fan located forwardly draws air through the rocks. The grid extends rearwardly of the aperture and is inclined. The water is dispensed by spray nozzles.

7 Claims, 3 Drawing Figures

GREENHOUSE LAVA ROCK COOLING PAD

BACKGROUND OF THE INVENTION

1. Field of the Invention

This invention relates in general to evaporative cooling systems and in particular to a cooling pad for a greenhouse utilizing porous rocks as the medium.

2. Background of the Invention

In the warmer parts of the country, greenhouses must have cooling for the hot months of the year. Medium and large size greenhouses normally have large exhaust fans located on one wall for drawing air through an aperture or window in the opposite wall. To cool the air, normally a large, vertical cooling pad will make up a large part of the opposite wall. There are various types of cooling pads, but in general, they employ an organic cellular or fibrous wood base material through which the air is drawn. Water is circulated to the top of the pad where it drips through the pad to cause evaporation and cool the air passing through the pad.

While these pads are able to cool the air, they deteriorate, clog and require replacement periodically. Also, they reduce the air flow. Moreover, it would be advantageous to have increased evaporation to increase the cooling and lower the temperature through the greenhouse.

A porous inorganic medium such as lava rock is sometimes placed on the ground within the greenhouse. The rocks are moistened to increase humidity in the greenhouse. To applicant's knowledge, these rocks have never been used in a position where air could be drawn through them.

SUMMARY OF THE INVENTION

In this invention, a cooling system is employed for buildings or greenhouses of the type that have fan means for circulating air through the building. A grid is mounted over an aperture through which air is drawn. A porous inorganic medium is carried by the grid, preferably lava rocks. The grid inclines rearwardly from the rear wall of the greenhouse. A spray system sprays water on the rocks to cause evaporation.

DESCRIPTION OF THE PREFERRED EMBODIMENT

Figure 1:
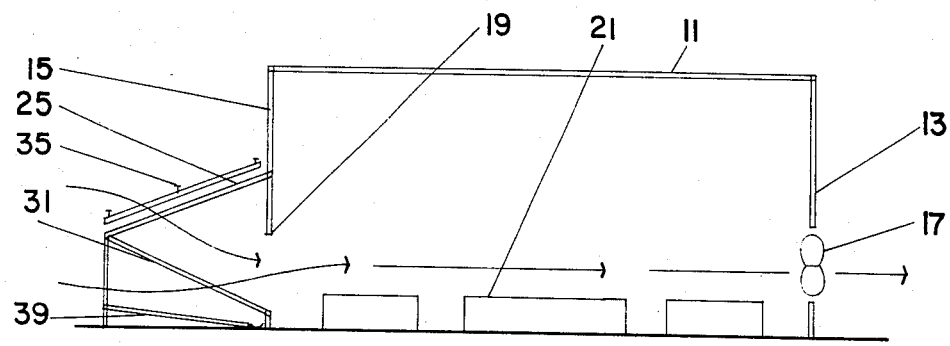
FIG. 1 is a schematic sectional view illustrating a greenhouse having a cooling system constructed in accordance with this invention.
Figure 3:
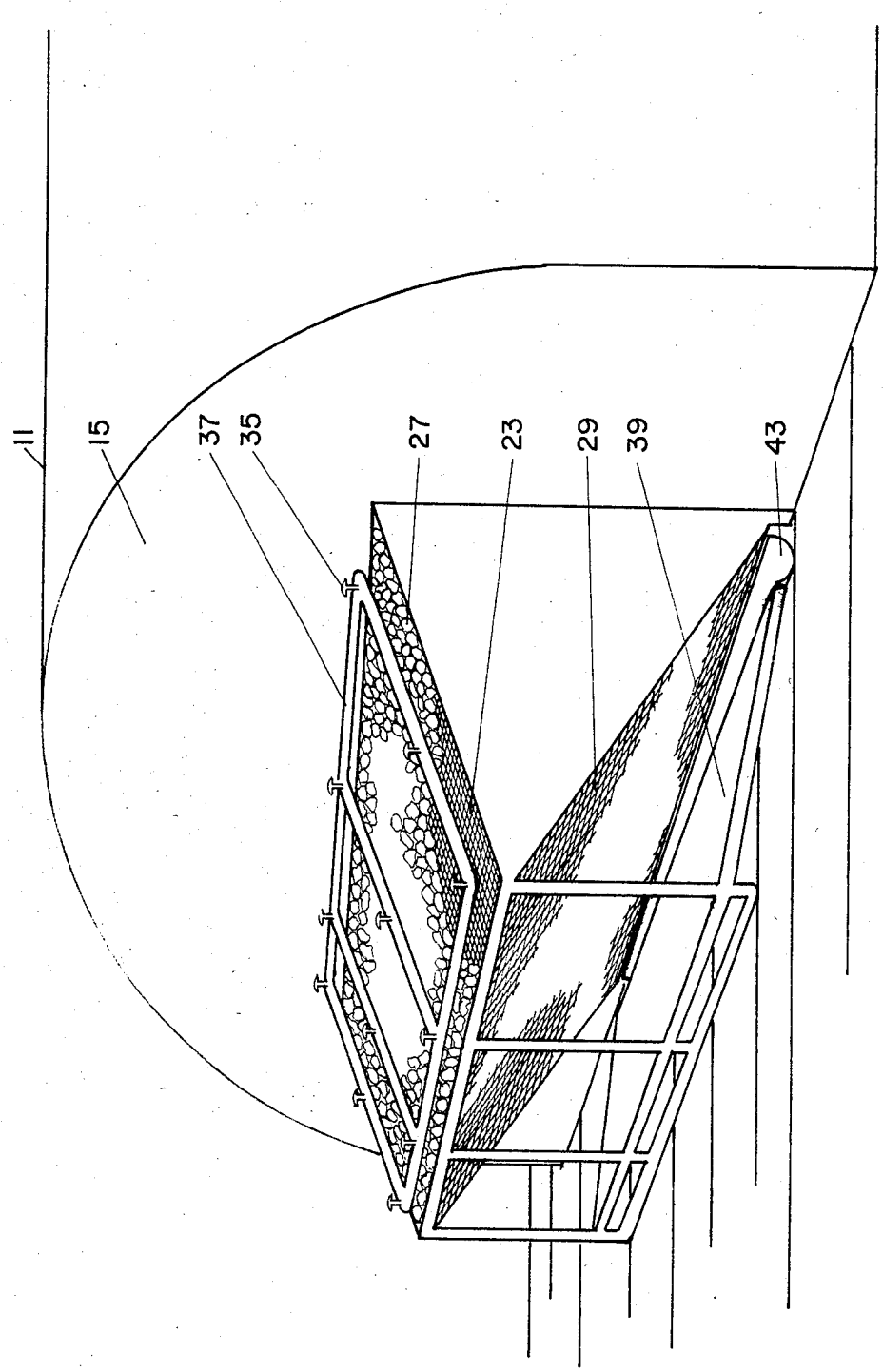
FIG. 3 is a perspective view of the cooling system of FIG. 1.

Referring to FIG. 1, greenhouse 11 may be of many different types, but will have a frame with walls of glass or plastic through which light is transmitted. The greenhouse may have a semi-circular roof, as shown in FIG. 3, or have vertical sidewalls. Greenhouse 11, in either case, will have a forward wall 13 and a rearward wall 15, both of which will normally be vertical. A plurality of large fans 17 are located in the forward wall for discharging air to the exterior. The air is drawn through an aperture 19 in the rearward wall, which is normally quite large, comprising a large portion of the rearward wall 15. As indicated by the arrows in FIG. 1, the air is drawn past plant benches 21 containing the plants.

Figure 2:
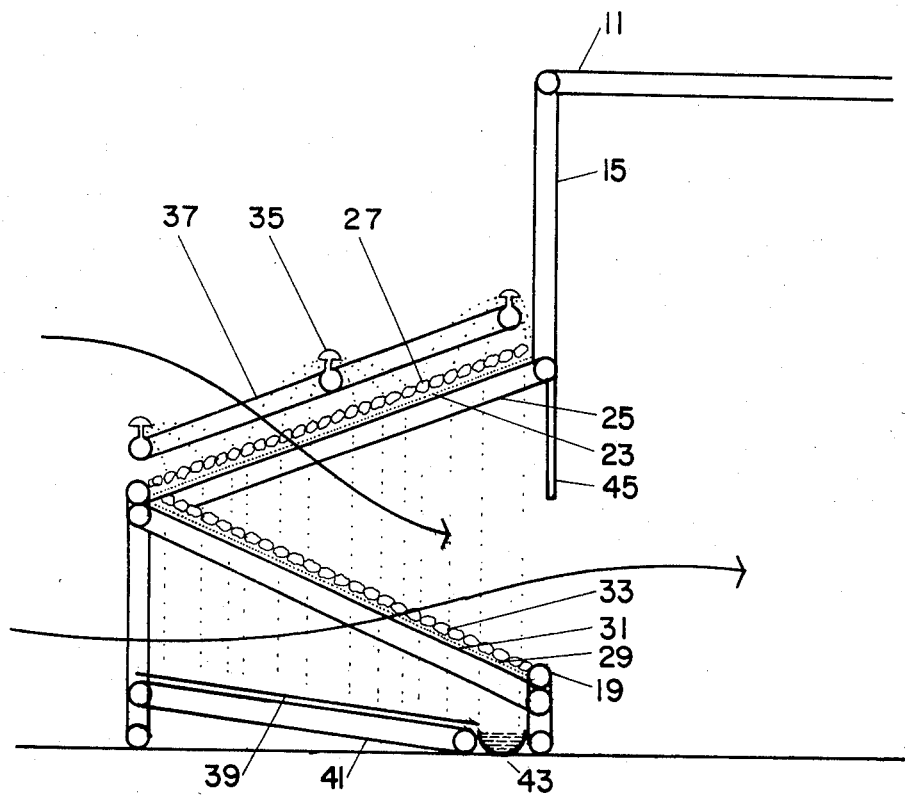
FIG. 2 is an enlarged, schematic sectional view of a portion of the greenhouse shown in FIG. 2.

The cooling system, as shown in FIGS. 2 and 3, includes a wire upper grid 23, located exterior of greenhouse 11. Upper grid 23 is a stiff reticulated wire screen, with the wires interwoven to provide relatively large square apertures. Upper grid 23 is supported on a frame 25 and located in generally a single plane that intersects wall 15. The forward end of frame 25 joins the rearward wall 15 above the upper edge of aperture 19. The plane containing upper grid 23 and its frame 25 inclines downwardly with respect to rearward wall 15 at about a 20° angle. The upper grid 23 is covered with a layer of lava rocks 27. Rocks 27 are porous rocks of lava with an irregular configuration, shape and size. In general, the rocks 27 have a dimension that is about 1 to 2 inches across, and they are placed on grid 23 in generally a single layer. The porosity of the rocks 27 provides a large surface area per rock for evaporation.

A wire lower grid 29 is located below the upper grid 23. Lower grid 29 is also comprised of a heavy wire screen mounted on a frame 31. Lower grid 29 joins the wall 15 below the aperture 19 and extends upwardly to join the rearward end of the upper grid 23. Lower grid 29 also is located in a plane that intersects the plane of the rearward wall 15 at about a 20° angle. This results in a triangular shaped configuration when viewed in cross-section. Lava rocks 33 are located in basically a single layer on top of the lower grid 29.

Water dispensing means for dispensing water on the rocks 27 and 33 for evaporation includes a plurality of spray nozzles 35, shown in FIGS. 2 and 3, mounted above the upper grid 23. Each spray nozzle 35 is connected to a source of water under pressure, which includes a series of pipes 37. Spray nozzles 35 are located no more than a few inches above the rocks 27.

As indicated by the dotted lines, the water wets the upper rocks 27 and also drips through to wet the lower rocks 33. An inclined pan 39 is located below the lower rocks 33. Pan 39 inclines downwardly from its rearward end to its forward end, leading to a trough means 43 which returns water to the pump (not shown) which supplies pressurized water to the pipes 37.

Referring still to FIG. 2, a wall section 45 can be removed to increase the dimension of the aperture 19 for increased air flow. Also, a similar removable section (not shown) can be used to entirely block the aperture 19 during winter months.

In operation, thermostats will control the fans 17 and the pump for the pipes 37. At the desired temperature, one or more of the fans 17 will begin exhausting air to the exterior, drawing it through the lava rocks 27 and 33. Water will be pumped from the spray nozzles 35 onto the upper rocks 27. Evaporation will take place on the upper rocks 27, with some of the water dripping through to wet the lower rocks 33. Evaporation will also take place at this point. Any excess water will drip through to pan 39 to return by means of trough 43 to the pump for the spray nozzles 35.

The invention has significant advantages. The lava rocks do not deteriorate, thus do not need replacement, unlike prior art organic type cooling pads. The lava rock cooling system allows a high flow rate of air and causes a high rate of evaporation due to the exposure to the sun. This provides very efficient cooling for the greenhouse.

While the invention has been shown in only one of its forms, it should be apparent to those skilled in the art that it is not so limited but is susceptible to various changes without departing from the scope of the invention.

I claim:

1. An evaporative cooling means for cooling the interior of a building having fan means for circulating air through the building, comprising in combination:

a grid mounted to an aperture in a wall of the building and located in a plane that is inclined and transverse to vertical;

a plurality of rocks carried by the grid; and spray means positioned coextensively over the plane of the grid in a pattern selected for spraying water substantially over all of the grid to wet the rocks, the air drawn by the fan means passing through the rocks and grid and being cooled by the evaporation, the inclination of the grid and the positioning of the spray means enhancing evaporation to increase cooling.

2. The cooling means according to claim 1 wherein the plane that contains the grid slopes downwardly and rearwardly from the wall of the building.

3. An evaporative cooling means for a greenhouse which has fan means located in one wall for drawing air through an aperture located in an opposite wall, comprising in combination:

a grid located at the opposite wall adjacent the aperture and extending at an inclination with respect to the opposite wall;

an inorganic porous medium carried by the grid; and spray means positioned above the grid in a pattern selected for spraying water simultaneously substantially over all of the grid to wet the medium for evaporation, the air drawn by the fan means passing through the medium and grid and being cooled by evaporation, the inclination of the grid and the positioning of the spray means enhancing evaporation to increase cooling.

4. The cooling means according to claim 3 wherein the grid is secured to the wall above the aperture and inclines downwardly from the exterior of the opposite wall.

5. The cooling means according to claim 3 further comprising an inclined pan located below the grid and leading to a trough means for catching water dripping through the grid and recirculating it to the spray means.

6. An evaporative cooling means for a greenhouse which has fan means located on a forward wall for drawing air through an aperture located in a rearward wall, comprising in combination:

a wire upper grid mounted to the exterior of the rearward wall above the aperture and inclining rearwardly and downwardly;

a wire lower grid mounted to the exterior of the rearward wall below the aperture and inclining upwardly to a junction with a rearward end of the upper grid;

a layer of lava rocks covering each of the grids; and a plurality of nozzles located above the upper grid and connected to a source of water under pressure for spraying the rocks in the upper grid to cause evaporation, a portion of the water falling through the rocks on the upper grid to wet the rocks on the lower grid, the inclination of the upper grid and the positioning of the spray means enhancing evaporation to increase cooling.

7. The cooling means according to claim 6 further comprising an inclined pan located below the lower grid and leading to a trough means for catching water dripping through the lower grid and recirculating it to the spray means.

* * * * *